Nov. 15, 1949  J. R. CAMPBELL  2,488,171
IDLING DEVICE
Filed Nov. 1, 1948  2 Sheets-Sheet 1

Inventor
James R. Campbell

By Clarence A. O'Brien
and Harvey B. Jacobson
Attorneys

Nov. 15, 1949    J. R. CAMPBELL    2,488,171
IDLING DEVICE
Filed Nov. 1, 1948    2 Sheets-Sheet 2
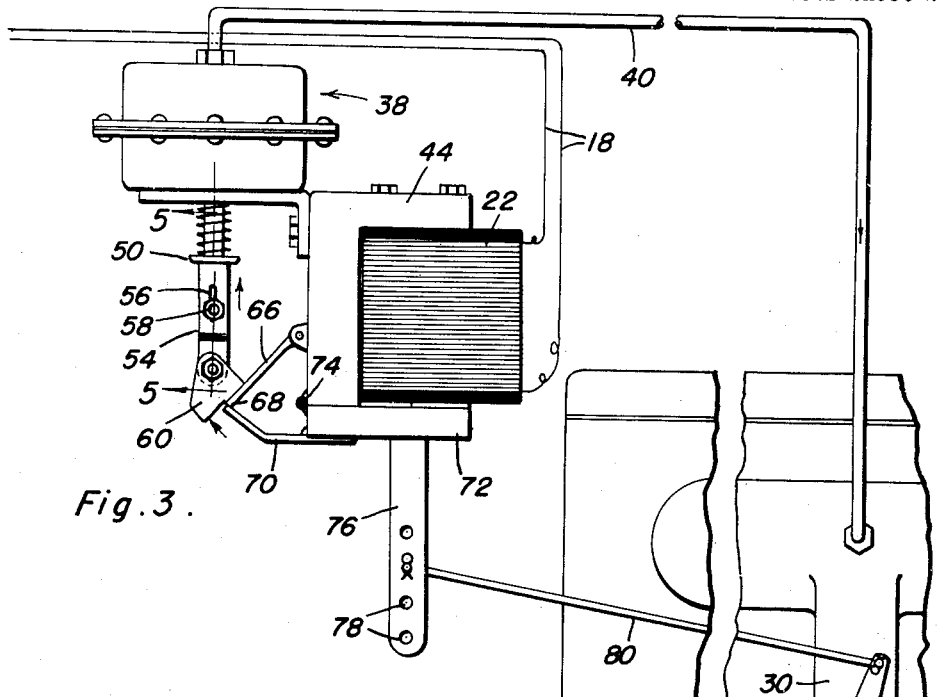
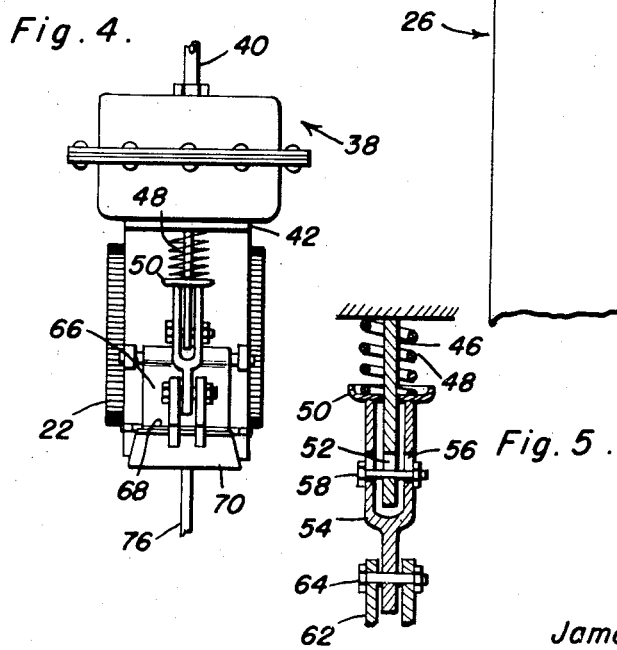
Inventor
James R. Campbell
By *Clarence A. O'Brien
and Harvey B. Jacobson*
Attorneys Patented Nov. 15, 1949

2,488,171

UNITED STATES PATENT OFFICE 2,488,171

IDLING DEVICE

James R. Campbell, Sissonville, W. Va., assignor of one-half to Ronald L. Harless, Winfield, W. Va.

Application November 1, 1948, Serial No. 57,712

5 Claims. (Cl. 290—40)

This invention relates generally to welding apparatus and more particularly to the combination of an electric welder, generator, and an internal combustion engine with means to provide for the idling of the engine.

A primary object of this invention is to provide for the idling of an engine driving a generator for an electric welder, and to incorporate with this idling means a delayed action control therefor, so that the operator will normally have time to change a welding rod or to move the welding rod to a new location without the idling means becoming operative, the idling means functioning only after a predetermined length of time.

Another object of this invention is to provide a device which will function as mentioned in the preceding object, and which is adjustable so that the time lapse can be varied to suit the particular conditions under which the welder is being used.

Still another object of this invention is to provide an idling device which may be provided as an accessory attachable to welding equipment which is already provided with a constant speed governor, the idling valve operating completely independently, as far as mechanical linkage is concerned, of the valve which is associated with the constant speed governor.

And a last object to be mentioned specifically is to provide an idling device for electric welding equipment which will be relatively inexpensive and practicable to manufacture, which is safe, simple and convenient to adjust and use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3 is an enlarged fragmentary view showing the principal elements involving new structure according to this invention, together with portions of an internal combustion engine having a carburetted fuel induction channel which is broken away, in part, to show the vavles associated therewith.

Figure 4 is an elevational view of a portion of the apparatus, the view being taken as from the left hand side of Figure 3; and, Figure 5 is a fragmentary vertical sectional view, taken substantially upon the line 5—5 in Figure 3.

Similar characters of reference designate similar or identical elements and portions throughout the specification and throught the several views in the drawings.

Figure 1:
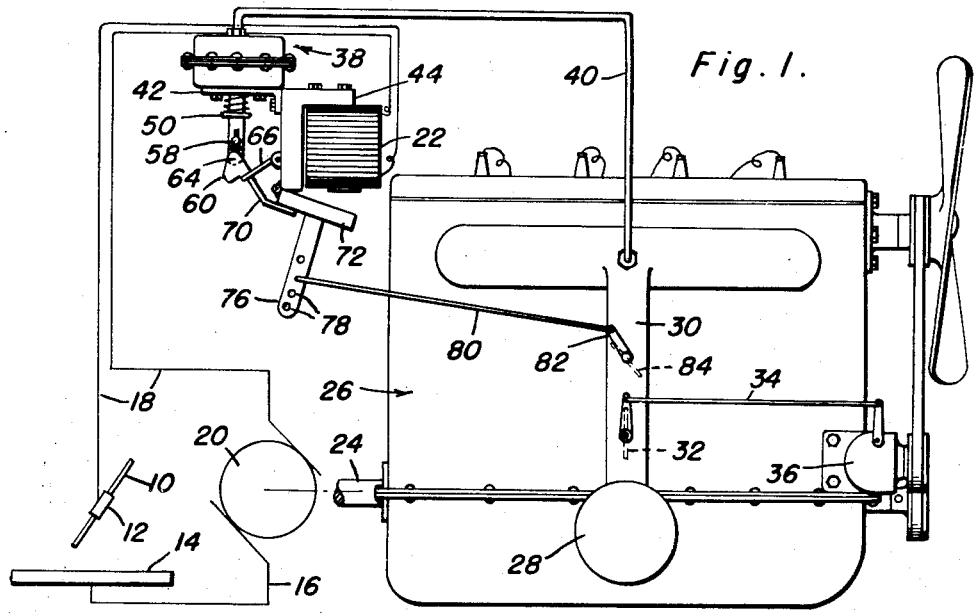
Figure 1 is a somewhat diagrammatic view of an internal combustion engine, a generator operated thereby and connected with a welding rod and the work, together with this invention operatively associated therewith.

Referring now to the drawings in detail, this invention is adapted to be used with an environment including a welding rod 10, a welding rod holder 12, and work 14. The work will be connected by an electrical lead 16 with one side of a generator 20 while the welding rod holder will be connected to the other side of the generator by a lead 18, and it will be noted that the lead 18 has a solenoid 22 connected therein, in series with the generator 20.

A drive shaft 24 connects the internal combustion engine, generally indicated at 26, with the generator 20 and a carbureter diagrammatically indicated at 28 is connected with a carburetted fuel induction channel 30 leading to an intake manifold of the engine. In this specification, the said channel 30 may be considered as including such a manifold. A valve 32 is operatively mounted in the channel 30 and is connected by means of a push rod 34 with a constant feed governor 36, all according to conventional design. A suitably encased diaphragm, generally indicated at 38, of any suitable design is connected by means of a tube 40 with the fuel induction channel 30 so as to be operated in response to changes in pressure in said channel. The figures illustrate a construction in which the encased diaphragm 38 is mounted by means of a bracket 42 upon an external portion of an inverted U-shaped member 44, one leg of which functions as a core for the electromagnet 22.

A bar 46 is connected to one side of the diaphragm and a spring 48, best illustrated in Figure 5, is compressed between the bracket 42 and a centrally apertured cupped washer 50 inserted over the bar 46. The bar 46 is slotted at 52 and a bifurcated link 54 having its arms slotted as at 56 is adjustably connected with the bar 46 by means of a bolt 58 inserted through the slots 52 and 56, so that a linkage is provided having an adjustable amount of lost motion.

A latch 60, including a pair of lugs 62 pivoted as at 64 to the lower end of the bifurcated link 54, is pivotally mounted upon adjacent fixed structure such as the outer leg of the member 44. It will be clear that the spring 48 will bias the cupped washer 50 downwardly against the upper ends of the forks of the bifurcated link 54, thus biasing the latch 60 downwardly. The latch 60 is rigidly secured on an elongated member 66 pivoted to the member 44 and the actual working face of the latch 60 may comprise the end 68 of the member 66, and an extending member 70 is rigidly secured to the armature 72 and arranged so that the armature is locked by the latch engaging the member 70 when the latch is in downwardly extended position and the armature is in the position assumed thereby when the electromagnet 22 is energized. The armature 72 is pivoted as at 74 upon the member 44 and a depending arm 76 is rigidly secured to the armature 72 and provided with a plurality of apertures 78. An inflexible link 80 is terminally secured selectively in these apertures 78 and to a bell crank 82 operatively associated with an idling valve 84 mounted in the fuel induction channel 30.

Figure 2:
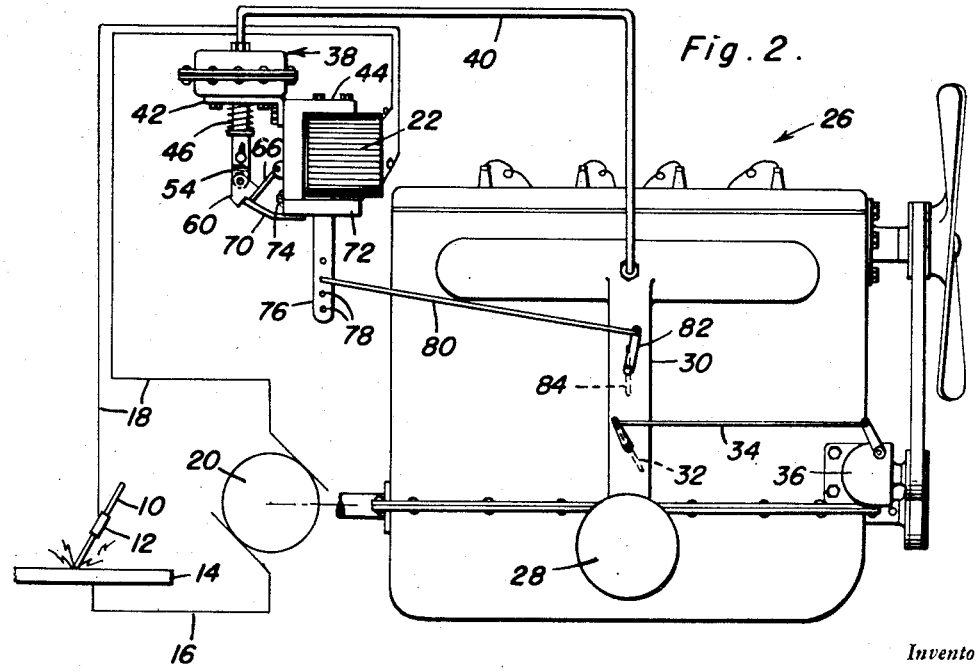
Figure 2 is a view similar to Figure 1 but showing the various elements in positions assumed during normal welding operation, rather than in the positions assumed when the welding arc is broken as indicated in Figure 1.

The operation of this invention will be reasonably clearly understood from a consideration of the drawings and the above recited objects of this invention. In recapitulation, it may be added that when the engine 26 and generator 20 are operating and an arc is drawn between the welding rod 10 and the work 14, current will flow through the coil of the solenoid 22, drawing the armature 72 into the position indicated in Figure 2 and opening the idling valve 84. The constant speed governor 36 will control the valve 32 during the normal operation of the apparatus. It will also be noted that during such normal operation, the valve 32 will be partly opened and a very high vacuum in the channel 30 will not exist and as a result the spring 48 will be able to bias the latch 60 into latching position as indicated in Figure 2.

However, when the welding arc is broken, the valve 32 is shifted by the governor into a more nearly closed position to prevent racing of the engine 26 when the load is removed from the generator 20. This partial closing of the valve 32 raises the vacuum in the channel 30 and the diaphragm is actuated to begin the raising of the bar 46. This action is not immediate and the spring 48 and the lost motion linkage comprised of the slotted bar 46 and the slotted arms of the bifurcated link 54 result in a retarded upward unlatching movement of the latch 60. In other words, the engine is not idled for a considerable and variable period of time, allowing the operator to change welding rods 10, to shift to a new position, or the like, and a substantially constant engine speed will be maintained during this interval. When the bar 46 has travelled a considerable distance, the bifurcated link 54 will have pivoted the latch 60 and the member 66 sufficiently to disengage the latch 60 from the latch engaging member 70. This action will, of course, close the idling valve 84.

It will be clear that all the above recited objects are amply achieved by this invention, and it will also be clear that minor modifications of the elements described above may be resorted to without departure from the spirit of this invention. Accordingly limitation of this invention should be only as determined by a proper interpretation of the sub-joined claims.

Having described the invention, what is claimed as new is:

1. Engine speed control apparatus for electric arc welding comprising an internal combustion engine operatively connected with said generator and having a throttle valve controlled by a constant speed governor, a solenoid in circuit relationship with the generator so as to be energized by flow of current from the generator and having an armature biased by gravity into retracted position, an idling valve in the carburized fuel induction channel of the engine connected to said armature so as to open when the solenoid is energized, a latch for said armature and a diaphragm in communication with said channel and mechanically connected to said latch so that said armature is insensitively operable in response to changes in pressure in said fuel induction channel, whereby delayed closing of said idling valve is provided when the generator current is interrupted.

2. Engine speed control apparatus for electric arc welding comprising an electric generator, an internal combustion engine operatively connected with said generator and having a throttle valve controlled by a constant speed governor, a solenoid in circuit relationship with the generator so as to be energized by flow of current from the generator and having an armature biased by gravity into retracted position, an idling valve in the carburized fuel induction channel of the engine connected to said armature so as to open when the solenoid is energized, and latch means for said armature insensitively operable in response to changes in pressure in said fuel induction channel, whereby delayed closing of said idling valve is provided when the generator current is interrupted, said latch means including a diaphragm operatively associated with said fuel induction channel, a latch to hold the armature in the position assumed when the solenoid is energized and lost motion linkage between said diaphragm and said latch.

3. A device according to claim 2 and wherein the amount of lost motion in said linkage is adjustable so as to vary the time lapse between said interruption of the generator current and the closing of said idling valve.

4. Engine speed control apparatus for electric arc welding comprising an electric generator, an internal combustion engine operatively connected with said generator and having a throttle valve controlled by a constant speed governor, a solenoid in circuit relationship with the generator so as to be energized by flow of current from the generator and having an armature biased by gravity into retracted position, an idling valve in the carburized fuel induction channel of the engine connected to said armature so as to open when the solenoid is energized, an extending member on said armature, a latch pivoted on adjacent fixed structure to engage said extending member in the position assumed thereby when the solenoid is energized, a diaphragm operatively associated with said fuel induction channel, a bar connected to said diaphragm, a link connecting said bar with said latch, said bar and link having slots and at least one of said slots having closed ends, a pin extending through both slots and adjustably securable in the other slot, whereby variable lost motion is obtained between said diaphragm and latch.

5. A device according to claim 4 and including a replaceable spring connected to bias said latch into latching position.

JAMES R. CAMPBELL.

REFERENCES CITED

The following references are of record in the file of this patent:

UNITED STATES PATENTS

| Number | Name | Date |
|---|---|---|
| 1,444,425 | Ogden | Feb. 6, 1923 |
| 1,991,078 | Brown et al. | Feb. 12, 1935 |
| 2,139,931 | Brunkow | Dec. 13, 1938 |
| 2,234,094 | Sprinkle | Mar. 4, 1941 |